United States Patent [19]
Koleff et al.

[11] 3,836,928
[45] Sept. 17, 1974

[54] APPARATUS FOR BRAKING AND ARRESTING INDEXIBLE CARRIERS FOR FILTERS OR THE LIKE

[75] Inventors: Boris Koleff, Munich; Erich Nagel, Anzing, both of Germany

[73] Assignee: AGFA Gevaert Aktiengesellschaft, Leverkusen, Germany

[22] Filed: Aug. 1, 1973

[21] Appl. No.: 384,400

[30] Foreign Application Priority Data
Aug. 3, 1972 Germany............................ 2238193

[52] U.S. Cl.................................... 354/100, 355/32
[51] Int. Cl. ............................................ G03b 33/08
[58] Field of Search......... 95/12.2; 355/32; 354/100

[56] References Cited
UNITED STATES PATENTS

| | | | |
|---|---|---|---|
| 1,984,420 | 12/1934 | Moulin................................ | 95/12.2 |
| 2,296,617 | 9/1942 | Mixer................................... | 95/12.2 |
| 2,474,958 | 7/1949 | Richards............................. | 95/12.2 |
| 2,503,647 | 4/1950 | Young.................................. | 95/4.5 |

*Primary Examiner*—John M. Horan
*Attorney, Agent, or Firm*—Michael S. Striker

[57] ABSTRACT

Photographic apparatus wherein a disk which carries several filters is indexible by a friction wheel to move a selected filter to a predetermined position. The disk is braked by a device wherein a pivotable holder supports a bell crank lever one arm of which constitutes a feeler and another arm of which constitutes a braking element for the disk. The holder is pivotable by an electromagnet to move the feeler into the path of projections provided on the disk adjacent to the filters. When an oncoming projection strokes against the feeler, the bell crank lever pivots relative to the holder and moves the braking element into frictional engagement with the peripheral surface of the disk.

14 Claims, 3 Drawing Figures

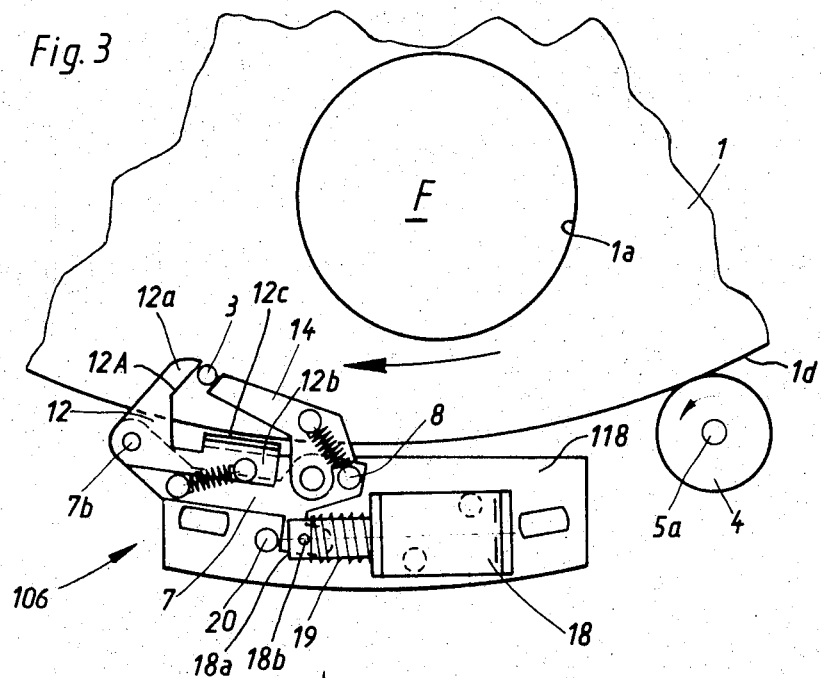
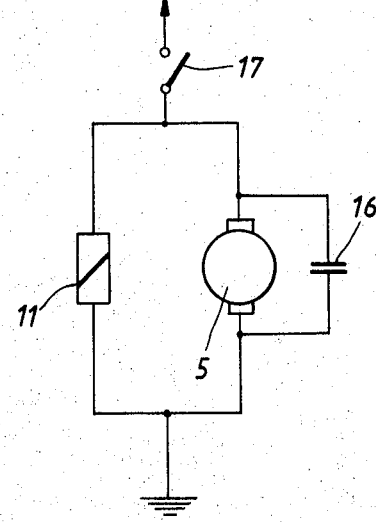

APPARATUS FOR BRAKING AND ARRESTING INDEXIBLE CARRIERS FOR FILTERS OR THE LIKE

CROSS-REFERENCE TO RELATED INVENTION

The apparatus of the present invention constitutes an improvement over and a further development of apparatus disclosed in the commonly owned U.S. Pat. No. 3,646,870 granted Mar. 7, 1972 to Koleff et al., for "Device for braking of shutter blades or the like."

BACKGROUND OF THE INVENTION

The present invention relates to apparatus wherein a rotary member is indexible between two or more predetermined positions. Such apparatus may constitute a photographic apparatus, for example, a photographic copying apparatus wherein a rotary member carries a number of filters which are movable into and from the path of light.

U.S. Pat. No. 3,646,870 discloses a device for the braking of shutter blades or the like wherein an actuating member or feeler can be engaged by the rotating blade to thereby move a braking element into frictional engagement with the blade shortly before the latter reaches a predetermined position. The patented device is satisfactory for the braking of a shutter which is movable only between a first and a second position, e.g., a position in which the shutter allows scene light to reach an unexposed film frame and a position in which the shutter intercepts incoming scene light. However, the patented device cannot be used as a means for braking and arresting an indexible member which is movable between a large number of positions, for example, to place a selected one of three or more filters across the path of a light beam.

SUMMARY OF THE INVENTION

An object of the invention is to provide a novel and improved apparatus which can be used with advantage to arrest an indexible member in any one of a number of different angular positions, with a high degree of reproducibility and in such a way that the desired angular position can be selected at will, for example, in order to place a selected one of three or more filters into a predetermined position in which the filter modifies a light beam.

Another object of the invention is to provide an apparatus wherein the means for arresting and braking the indexible member occupies little room and its energy requirements are low.

A further object of the invention is to provide an apparatus which can be installed in photographic printers to move selected filters across the path of light which passes through an original and is to impinge upon a layer of photosensitive material.

An additional object of the invention is to provide an apparatus wherein the indexible member can be arrested without any rebounding, even if it rotates at a high speed, and wherein the wear upon the indexible member and the parts of the braking and arresting means is less pronounced than in heretofore known apparatus.

The invention is embodied in an apparatus which comprises an indexible member (e.g., a disk-shaped carrier of several filters) which is rotatable about a predetermined axis and has spaced apart projections which are preferably located at the same distance from the predetermined axis, indexing means (e.g., a friction wheel which can be driven by an electric motor) which is actuatable to rotate the indexible member in a predetermined direction whereby the projections orbit along an endless path, and a braking device which includes a holder (e.g., a lever) which is movable between operative and inoperative positions, a feeler which is movably mounted on the holder and is located in the path of projections in the operative position of the holder so that an oncoming projection displaces the feeler relative to the holder from a first to a second position, a braking element which is arranged to frictionally engage the indexible member in response to displacement of the feeler to the second position, and electromagnet means for moving the holder between the operative and inoperative positions.

The feeler may constitute one arm of a bell crank lever which is pivotably mounted on the holder and another arm of which may constitute the braking element.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a diagram of the electric circuit of the apparatus of FIG. 1; and

FIG. 3 is a fragmentary elevational view of a modified apparatus.

DESCRIPTION OF THE PREFERRED EMBODIMENTS

Figure 1:
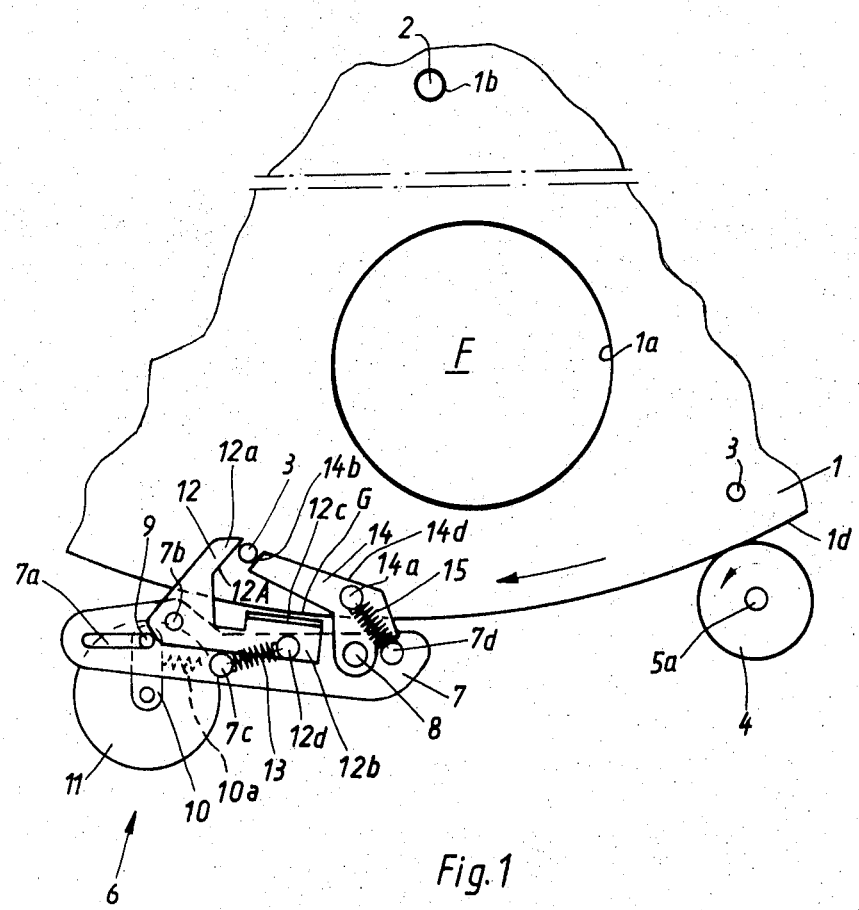
FIG. 1 is a fragmentary elevational view of an apparatus which embodies one form of the invention.

Referring first to FIG. 1, there is shown a portion of a disk-shaped indexible member 1 constituting a carrier for a number of filters F (only one shown) which are mounted in circular openings 1a. The disk 1 has an axial bore 1b for a stationary shaft 2 and is further provided with a plurality of projections in the form of pins 3, one for each of the filters F and each assuming a predetermined position with reference to the corresponding filter F. When the disk 1 dwells in the angular position of FIG. 1, the projection 3 which is associated with the illustrated filter F is engaged by a feeler 12a as well as by a blocking lever 14 which prevents the projection from rebounding on the surface 12A of the feeler 12a whereby the filter F extends across the path of light which has passed through an original and is to impinge on photosensitive material in a photographic copying apparatus. The disk 1 is indexible to rotate clockwise, as viewed in FIG. 1. Each filter F is assumed to transmit light of a different color or to have a different density. All of the projections 3 are located at the same distance from the axis of the shaft 2 and all openings 1a are assumed to have their centers on a circle whose center is located on the axis of the shaft 2. The disk 1 has a smooth circular peripheral surface 1d.

The means for indexing the disk 1 comprises an electric motor 5 (see FIG. 5) having an output shaft 5a which drives a friction wheel 4. The latter engages the peripheral surface 1d and rotates counterclockwise, as viewed in FIG. 1, when the electric motor 5 is started whereby the disk 1 rotates clockwise. The length of the interval during which the circuit of the motor 5 remains completed determines the extent of angular displacement of the disk 1.

The arresting and braking device 6 for the disk 1 comprises a holder 7 which is a lever pivotable about the axis of a fixed shaft 8 and having an elongated slot 7a which extends substantially tangentially of the peripheral surface 1d when the feeler 12a engages the adjacent projection 3. The slot 7a is remote from the shaft 8 and receives a pin 9 provided at the free end of an armature 10 forming part of a rotary electromagnet 11. When the electromagnet 11 is deenergized, a spring 10a maintains the armature 10 in the angular position of FIG. 1. The effective length of the armature 10 equals or approximates the length of the slot 7a in the holder 7. In the deenergized condition of the electromagnet 11, the armature 10 extends substantially radially of the disk 1. When the electromagnet 11 is energized in response to closing of a master switch 17 shown in FIG. 2, the armature 10 is turned counterclockwise through an angle of substantially 90° whereby the holder 7 pivots counterclockwise through an acute angle and moves the feeler 12a away from the adjacent projection 3.

That portion of the holder 7 which is remote from the shaft 8 further carries a pivot member 7b for a bell crank lever 12 which has two arms 12a and 12b. The arm 12a constitutes the aforementioned feeler and the arm 12b has a brake lining 12c which can be moved against the peripheral surface 1d of the disk 11 when the bell crank lever 12 is caused to pivot relative to the holder 7 in a counterclockwise direction, as viewed in FIG. 1. When the electromagnet 11 is deenergized, the brake lining 12c is separated from the peripheral surface 1d by a narrow gap G. A helical spring 13 is attached to a post 7c of the holder 7 and to a post 12d on the arm 12b of the bell crank lever 12 so that the lever 12 tends to turn clockwise, as viewed in FIG. 1, and normally abuts against the post 7c. In such first position of the bell crank lever 12, the brake lining 12c is separated from the peripheral surface 1d of the disk 1 by the aforementioned gap G.

The blocking lever 14 is pivotable on the shaft 8 and is biased clockwise, as viewed in FIG. 1, by a helical spring 15. The latter is attached to a first post 7d on the holder 7 and to a second post 14a on the blocking lever 14 so that the lever 14 normally abuts against the post 7d. The lever 14 has an edge face 14b which is located behind the adjacent projection 3, as viewed in the direction of (clockwise) rotation of the disk 1, so that the projection 3 cannot rebound when it strikes against the inclined surface 12A of the feeler 12a.

FIG. 2 illustrates the electric circuit of the apparatus. The rotary electromagnet 11 is connected in series with an energy source (not shown) and its circuit is completed in response to closing of the master switch 17. The electromagnet 11 is connected in parallel with the electric motor 5 of the means for indexing the disk 1, and the motor 5 is connected in parallel with a capacitor 16 which constitutes a time-delay element insuring that the circuit of the motor 5 is completed with a predetermined delay following the energization of electromagnet 11. The motor 5 is assumed to be a d-c motor.

The operation:

When the electromagnet 11 is deenergized and the motor 5 is idle, the parts of the braking device 6 assume the positions shown in FIG. 1. Thus, the surface 12A and the edge face 14b flank the adjacent projection 3 so that the disk 1 is maintained in a predetermined angular position in which the illustrated filter F extends across the beam of light which has passed through an original. If the operator (or an automatic control system) closes the master switch 17 for a selected interval of time, the electromagnet 11 is energized in immediate response to closing of the switch 17 and causes the armature 10 to pivot in a counterclockwise direction, as viewed in FIG. 1, and to thereby move the holder 7 from the illustrated operative position to an inoperative position in which the projections 3 can bypass the feeler 12a. The motor 5 is started with a delay which is determined by the capacitor 16. As the armature 10 pivots counterclockwise, it pivots the holder 7 in a counterclockwise direction toward the inoperative position and the holder 7 withdraws the feeler 12a from the path of the adjacent projection 3 before the motor 5 is started to rotate the disk 1 in a clockwise direction. An advantage of delayed starting of the motor 5 is that the friction wheel 4 can start to rotate the disk 1 without being compelled to overcome the friction between the projection 3 and surface 12A and/or the friction between the holder 7 and its shaft 8. Such friction is overcome by the electromagnet 11.

In the position of the feeler 12a shown in FIG. 1, the surface 12A makes an acute angle of at least 10° with a line which extends radially from the axis of the shaft 2. This insures that, when an oncoming projection 3 moves toward and strikes against the surface 12A, there develops a force having a component acting in a direction radially of the disk 1 and toward the axis of the shaft 2. The axis of the shaft 8 is preferably located in a plane which is normal to the surface 12A when the latter is engaged by a projection 3. The just mentioned plane preferably includes the line of contact between the surface 12A and the adjacent projection 3. This insures that the holder 7 can pivot between its operative and inoperative positions without changing the friction between the projection 3 and surface 12A.

When the switch 17 is opened again after a predetermined interval of time which is needed to move a selected filter close to the braking device 6, the motor 5 is disconnected from the energy source and the electromagnet 11 becomes deenergized so that the armature 10 pivots clockwise back toward the position of FIG. 1. The surface 12A of the feeler 12a is then located in the path of the oncoming projection 3 (the disk 1 continues to rotate clockwise due to inertia). Before the oncoming projection 3 actually reaches the surface 12a, it rides over an inclined surface 14d of the blocking lever 14 which is thereby caused to pivot counterclockwise and to stress the spring 15. The spring 15 contracts as soon as the projection 3 moves beyond the surface 14d whereby the edge face 14b moves behind the projection and prevents it from rebounding upon impact against the surface 12A. During the next stage of movement of the disk 1, the projection 3 engages the surface 12A and pivots the bell crank lever 12 counterclockwise from a first to a second position in which the brake lining 12c engages the surface 1d and immediately arrests the disk 1. The braking force which is supplied by the arm 12b of the bell crank lever 12 is proportional to kinetic energy of the disk 1. This insures that the disk 1 is braked softly without abrupt stoppage and without any rebounding of the projection 3 on the surface 12A. The pin-and-slot connection 7a, 9 between the holder 7 and the electromagnet 11 prevents the lining 12c from moving away from the surface 1d during braking. The holder 7 and the armature 10 then provide a self-locking action which prevents the holder 7 from yielding while the lining 12c engages the surface 1d.

The projections 3 may constitute the shanks of rivets having heads located at the opposite side of the disk 1. If the rivets are secured to the disk 1 by means of an adhesive, they are preferably provided with relatively large heads which contribute to intertia of the rotating parts. Therefore, the projections 3 may be replaced by projections in the form of lugs which are integral parts of the disk 1 and are formed by stamping and thereupon bending portions of the disk 1 from the plane which is normal to the axis of the shaft 2.

It is clear that the disk 1 can be provided with a rib (not shown) which is engaged by the lining 12c when the holder 7 assumes its operative position and the feeler 12a moves to its second position by pivoting relative the holder 7 in response to engagement with an oncoming perforation. The rib is preferably provided with a smooth cylindrical surface (corresponding to the surface 1d of the disk 1) to thus insure that the lining 12c and the friction wheel 4 are subjected to negligible wear and can stand long periods of use.

The springs 13 and 15 cooperate to insure that the lining 12c is separated from the surface 1d by the gap G when the disk 1 is brought to a full stop. The blocking lever 14 then abuts against the post 7d and the bell crank lever 12 abuts against the post 7c.

The modified apparatus of FIG. 3 exhibits the advantage that the braking device 106 occupies less room, as considered in the radial direction of the disk 1, and that the energy requirements of the current-consuming parts are lower because the braking device 106 does not employ a rotary electromagnet but rather an electromagnet 18 with a reciprocable armature 18a. The armature 18a is articulately connected to the holder 7 by means of a pin 18b which allows the holder 7 to pivot about the axis of the shaft 8 when the armature 18a moves lengthwise. The electromagnet 18 can stress a helical spring 19 or analogous biasing means for urging the armature 18a to the illustrated position in which the surface 12A of the feeler 12a extends into the path of movement of projections 3 on the disk 1. The holder 7 then abuts against a stop pin 20 provided on a supporting plate 118 for the electromagnet 18.

When the braking device employs a reciprocable electromagnet in place of the rotary electromagnet 11 of FIGS. 1 and 2, problems can arise in connection with prevention of such movements of the pivot member 7b for the bell crank lever 12 that the bell crank lever would allow the brake lining 12c from moving away from the peripheral surface 1d during braking. Such problems are attributable to the fact that only the spring 19 maintains the bell crank lever 12 in the illustrated position when the electromagnet 18 is energized.

In accordance with a feature of the invention, undesirable movements of the bell crank lever 12 during braking are prevented by selecting the positions of pivot axes and the lever arms of movable parts of the braking device 106 in such a way that the resultant of a first force furnished by the projections 3 and acting upon the inclined surface 12A of the feeler 12a, a second force which the lining 12c on the arm 12b applies against the disk 1, and a third force which is produced by friction and acts upon the pivot member 7b for the bell crank lever 12 in a direction which is substantially tangential to the peripheral surface 1d transmits to the holder 7 a torque which acts in a clockwise direction. Such torque at most equals the force with which the spring 19 biases the holder 7 against the stop 20. This can be readily achieved by appropriate selection of the positions of pivot axes for the parts 7 and 12. As considered in the direction of rotation of the disk 1, the pivot axis (shaft 8) for the holder 7 is preferably separated from the pivot axis (7b) for the bell crank lever 12 by a distance which equals or approximates twice the effective length of the feeler 12a. Also, the length of the braking arm 12b preferably equals or approximates the length of the feeler 12a. Still further, the distance between the pivot member 7b and the center of the disk preferably equals or approximates the distance between the center of the disk 1 and the axis of the shaft 8.

The mode of operation of the apparatus of FIG. 3 is analogous to that of the apparatus shown in FIGS. 1 and 2. The feeler 12a moves away from the path of projections 3 in response to energization of the electromagnet 18. When the feeler 12a returns into the path of projections 3, it is displaced by the oncoming projection 3 relative to the holder 7 to move from a first to a second position and thereby causes the arm 12b to urge the lining 12c against the peripheral surface 1d until the disk 1 is brought to a full stop. The pivot member 7b for the bell crank lever 12 is prevented from yielding during braking due to the aforementioned selection of parameters including the distance between the axes of the parts 7b, 8, the length of the arms 12a, 12b and the distance between the parts 7b, 8 and the center of the disk 1.

Without further analysis, the foregoing will so fully reveal the gist of the present invention that others can, by applying current knowledge, readily adapt it for various applications without omitting features whch fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In an apparatus of the character indicated, particularly in a photographic apparatus, a combination comprising an indexible member rotatable about a predetermined axis and having spaced apart projections; indexing means actuatable to rotate said indexible member in a predetermined direction whereby said projections orbit along an endless path; and a braking device including a holder pivotable about a fixed axis between operative and inoperative positions, a feeler pivotably mounted on pivot means on said holder and being located in the path of said projections in said operative position of said holder whereby an oncoming projection angularly displaces said feeler relative to said holder from a first to a second position, a braking element arranged to frictionally engage said indexible member in response to angular displacement of said feeler to said second position, and electromagnet means for pivoting said holder between said operative and inoperative positions.

2. A combination as defined in claim 1, wherein said indexible member is a disk having a plurality of filters, one for each of said projections and each arranged to assume a predetermined position when the respective projection is engaged by said feeler.

3. A combination as defined in claim 1, wherein said braking element is mounted on said pivot means for movement into and from frictional engagement with said indexible member and thereby moves substantially radially of said indexible member.

4. A combination as defined in claim 1, wherein said feeler has a surface which extends into the path of movement of an oncoming projection in said operative position of said holder and makes with a line extending radially from said predetermined axis an acute angle so that the engagement of said surface by the oncoming projection results in the generation of a displacing force acting on said feeler and having a component directed toward said predetermined axis.

5. A combination as defined in claim 4, wherein said angle exceeds 10 degrees and said fixed axis is located in a plane which is substantially normal to said surface.

6. A combination as defined in claim 1, wherein said electromagnet means comprises a rotary armature and further comprising a pin-and-slot connection between said armature and said holder.

7. A combination as defined in claim 6, further comprising resilient means for maintaining said holder in said operative position by way of said armature and said pin-and-slot connection in the deenergized condition of said electromagnet means.

8. A combination as defined in claim 7, wherein said holder cooperates with said armature to produce a self-locking action and to thus remain in said operative position in deenergized condition of said electromagnet means.

9. A combination as defined in claim 1, further comprising fixed stop means for said holder when the latter assumes said operative position and resilient means for biasing said holder against said stop means, the distance between said fixed axis and the axis of said pivot means being about two times the distance between the axis of said pivot means and the point of contact between said feeler and an oncoming projection.

10. A combination as defined in claim 9, wherein the distance between said predetermined axis and said fixed axis equals or approximates the distance between said predetermined axis and the axis of said pivot means in one position of said holder.

11. A combination as defined in claim 10, wherein said feeler is arranged to transmit to said holder torque in response to engagement by an oncoming projection whereby the magnitude of said torque at most equals the force with which said resilient means biases said holder against said stop means.

12. A combination as defined in claim 9, wherein said electromagnet means comprises a reciprocable armature.

13. A combination as defined in claim 1, further comprising blocking means coupled with said holder and arranged to hold an oncoming projection against movement away from said feeler in said operative position of said holder.

14. A combination as defined in claim 13, wherein said blocking means yieldably extends into said path ahead of said feeler and is temporarily displaced by an oncoming projection while the latter moves toward engagement with said feeler in said operative position of said holder.

* * * * *